(12) United States Patent
Nakayama

(10) Patent No.: US 7,284,026 B2
(45) Date of Patent: Oct. 16, 2007

(54) HADAMARD TRANSFORMATION METHOD AND DEVICE

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 10/603,603

(22) Filed: Jun. 26, 2003

(65) Prior Publication Data
US 2004/0006581 A1 Jan. 8, 2004

(30) Foreign Application Priority Data
Jul. 2, 2002 (JP) ............................. 2002-193298

(51) Int. Cl.
*G06F 17/14* (2006.01)
(52) U.S. Cl. ..................................... 708/400
(58) Field of Classification Search ........ 708/400–410; 382/240–244
See application file for complete search history.

(56) References Cited

U.S. PATENT DOCUMENTS

| | | | |
|---|---|---|---|
| 5,856,935 A * | 1/1999 | Moy et al. .................. 708/410 |
| 6,101,279 A * | 8/2000 | Nguyen et al. ............. 382/240 |
| 6,195,465 B1 * | 2/2001 | Zandi et al. ................ 382/248 |
| 6,222,941 B1 * | 4/2001 | Zandi et al. ................ 382/232 |
| 6,567,019 B2 | 5/2003 | Nakayama |
| 6,732,130 B2 * | 5/2004 | Shoji ........................... 708/400 |
| 2002/0168113 A1 | 11/2002 | Nakayama |

OTHER PUBLICATIONS

K. Komatsu, et al., "Reversible Discrete Cosine Transform," Institute of Industrial Science, The University of Tokyo, 1E97-83, pp. 1-6 (Nov. 1997).
S. Fukuma, et al., "*Lossless 8-Point Fast Discrete Cosine Transform Using Lossless Hadamard Transform*," Shingaku Giho IEICE, DSP99-103, ICD99-190, IE99-65, pp. 37-44 (Oct. 1999).

* cited by examiner

*Primary Examiner*—Chat C. Do
(74) *Attorney, Agent, or Firm*—Fitzpatrick, Cella, Harper & Scinto

(57) ABSTRACT

Input signals are transformed with an Hadamard transformation matrix in each of the four four-point Hadamard transformation units, wherein a rounding unit rounds up the least significant bit of each of the odd number of coefficients and discards the least significant bit of each of the remaining odd number of coefficients among the four transformed coefficients output from each of the four-point Hadamard transformation units to produce four sets of four integer coefficients, and one integer coefficient is selected from each set, and four selected integer coefficients including odd number of rounded up are input to an Hadamard transformation unit and are Hadamard transformed, and the Hadamard transformed coefficients are rounded up to produce integer.

11 Claims, 14 Drawing Sheets

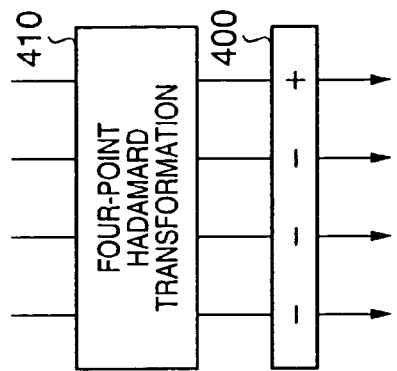
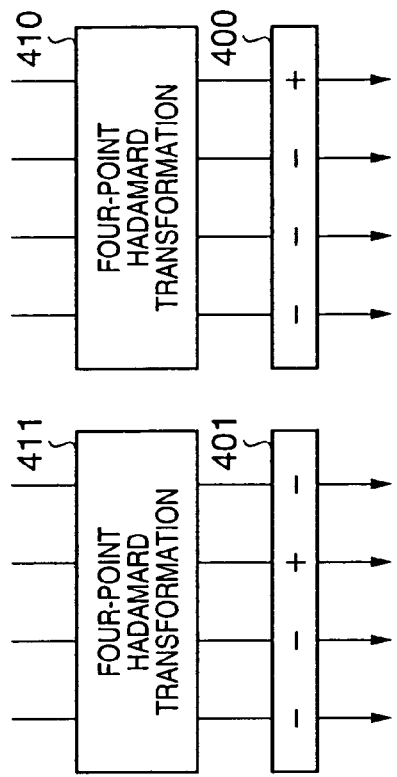
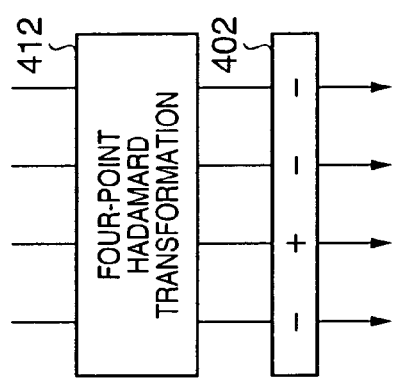
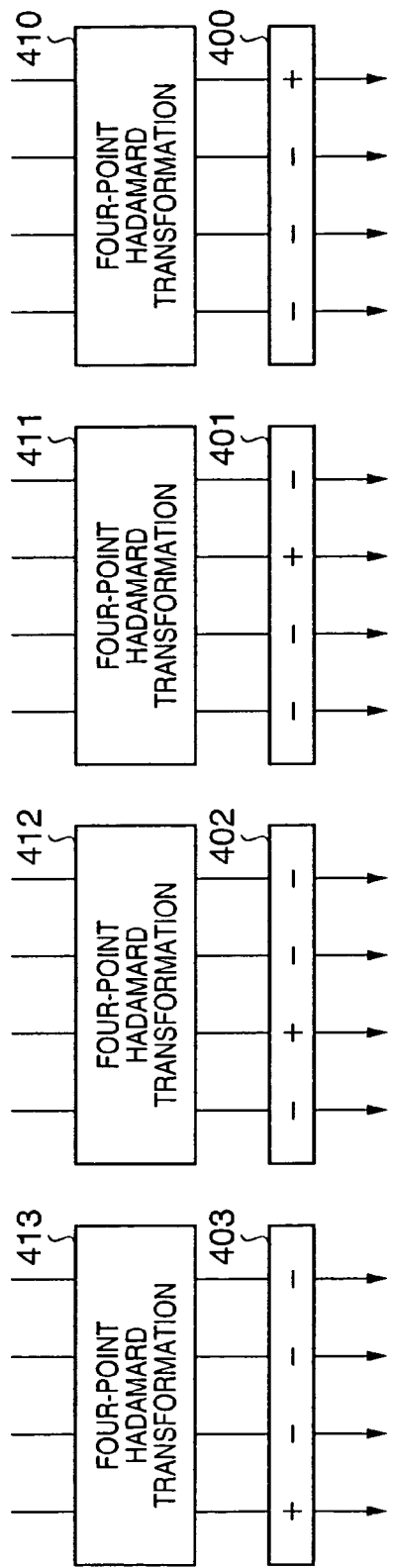
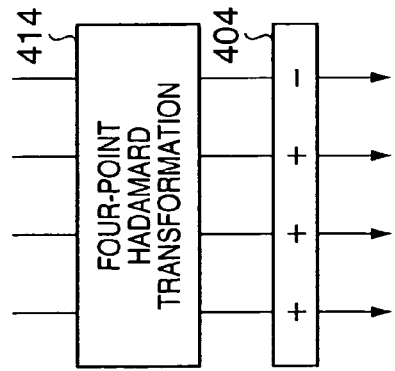
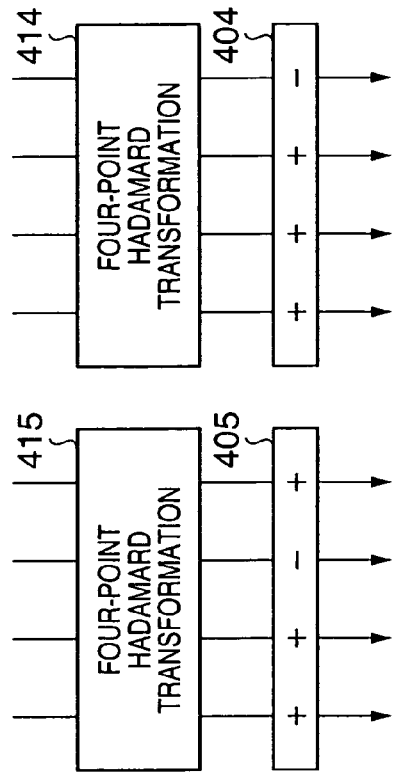
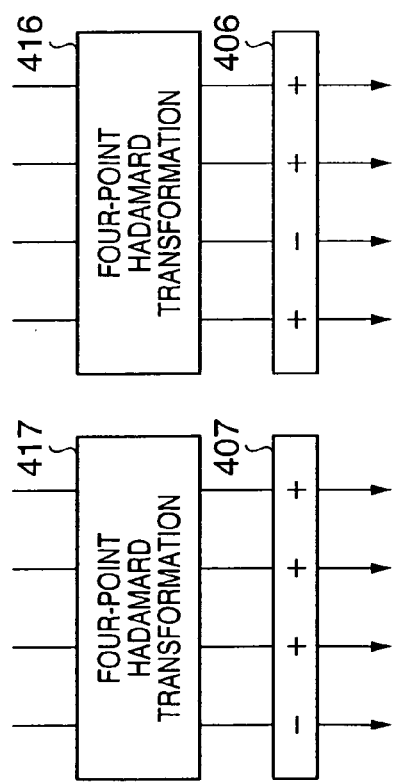
FIG. 4A  FIG. 4B  FIG. 4C  FIG. 4D  FIG. 4E  FIG. 4F  FIG. 4G  FIG. 4H

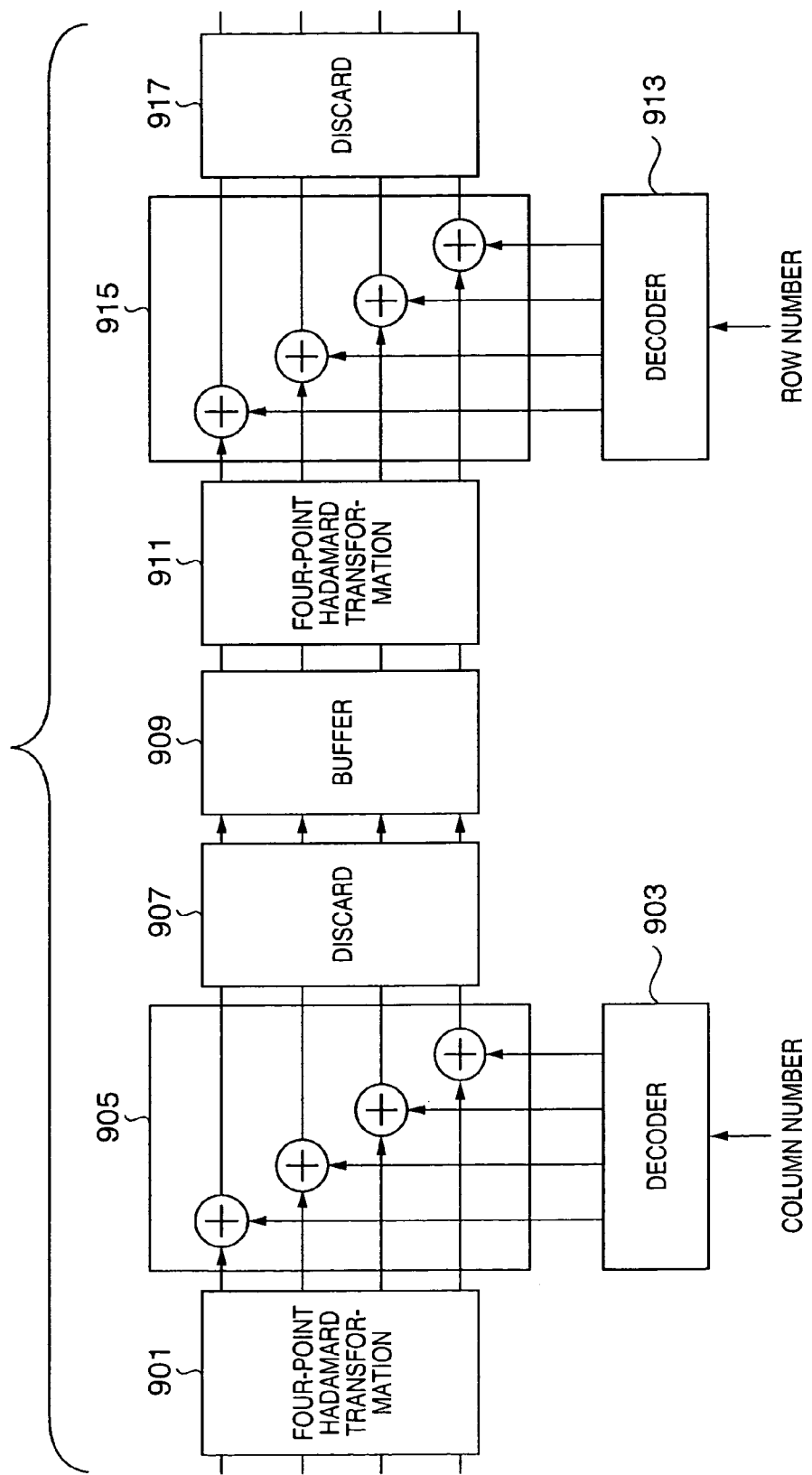

FIG. 14

| | | THIS EMBODIMENT | DOCUMENT 1 | DOCUMENT 2 |
|---|---|---|---|---|
| MAXIMUM ERROR | MAXIMUM VALUE | 3 | −5 | −4 |
| MEAN SQUARE ERROR PER PIXEL | MAXIMUM VALUE | 0.4693 | 1.5643 | 1.7630 |
| | AVERAGE OF TOTAL PIXELS | 0.4342 | 1.0045 | 0.6478 |
| MEAN ERROR PER PIXEL | MAXIMUM VALUE | −0.0145 | 0.0232 | −1.0560 |
| | AVERAGE OF TOTAL PIXELS | 0.0011 | 0.0005 | 0.1681 |

HADAMARD TRANSFORMATION METHOD AND DEVICE

FIELD OF THE INVENTION

The present invention relates to an Hadamard transformation method and device capable of making the reversible transformation to output the integer data.

BACKGROUND OF THE INVENTION

An image, especially a multi-valued image contains a very large amount of information, and when the image is stored or transmitted, its data amount causes a problem. Therefore, to store or transmit the image, a high efficient coding is employed for coding the image data, in which the multi-valued image has the redundancy removed, or the content of the multi-valued image is changed to the extent that the image quality degradation is visually unrecognizable to reduce the data amount. For example, in a JPEG recommended by the ISO and ITU-T as the international standard coding system for still image, the image data is subjected to a Discrete Cosine Transformation (DCT) into DCT coefficients for each block (8 pixels×8 pixels), each DCT coefficient being quantized, and further the quantized value is entropy coded to compress the image data. The compression techniques using this DCT include H261, MPEG1/2/4, in addition to the JPEG.

An Hadamard transformation is a process associated with this DCT transformation or a process for transforming the image data. The Hadamard transformation is an orthogonal transformation with a transformation matrix composed of the elements of "1" and "−1", which is the simplest one that is represented only by addition and subtraction.

For this Hadamard transformation, a transformation matrix $H_2$ for two-point Hadamard transformation is defined in the following way.

[Expression 1]

$$H_2 = \frac{1}{\sqrt{2}} \begin{bmatrix} 1 & 1 \\ 1 & -1 \end{bmatrix} \quad (1)$$

A typical N ($=2^N$)-point Hadamard transformation matrix $H_N$ is recursively defined as a Kronecker product between the (N/2)-point Hadamard transformation matrix $H_{N/2}$ and the two-point Hadamard transformation matrix $H_2$.

[Expression 2]

$$H_N = H_{N/2} \otimes H_2 = \frac{1}{\sqrt{2}} \begin{bmatrix} H_{N/2} & H_{N/2} \\ H_{N/2} & -H_{N/2} \end{bmatrix} \quad (2)$$

A four-point Hadamard transformation matrix is obtained from the above definition in the following way.

[Expression 3]

$$H_4 = \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (3)$$

This four-point Hadamard transformation matrix is called a natural type, in which the base vectors are not arranged in sequency. Thus, if the permutation of the base vectors is repeated to shift the base vector in the second row to the fourth row, a transformation matrix $WH_4$ having the base vectors arranged in sequency results.

[Expression 4]

$$WH_4 = \frac{1}{2} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (4)$$

This transformation matrix $WH_4$ is called a Walsh type or a Walsh-Hadamard transformation matrix. It is well known that the Hadamard transformation is a reversible orthogonal transformation, in which both the natural type and the Walsh type are capable of the reversible transformation, and the transformation matrix is symmetrical.

It is generally said that the Hadamard transformation is a reversible transformation as is described above, which means that it is mathematically reversible. That is, it is supposed that no arithmetical operation error arises in the transformation and the reverse transformation. For this reversible transformation, it is required to perform the arithmetical operation in the fixed point and the floating point, and hold all the data of significant digits after the transformation processing.

However, in the Hadamard transformation in which the compression coding is supposed, there is a desire to reduce the number of significant digits as much as possible after the transformation processing. More specifically, the data after the decimal fractions that arises when the integer input data is transformed is grasped to have clearly more digits (information) than the input data, whereby it is indispensable to omit the data after the decimal fractions to compress the data. However, if this data after the decimal fractions is simply rounded, the reversible property is impaired. For example, four pieces of data, including 123, 78, 84 and 56, are subjected to the Hadamard transformation with a transformation matrix of the expression (4) in the following way.

170.5(=(123+78+84+56)/2), 30.5(=(123+78−84−56)/2),
8.5(=(123−78−84+56)/29, 36.5(=(123−78+84−56)/2)

Rounding off the above values into the integer,
171, 31, 9, 37 are obtained. Then, making the reverse transformation (with a transposed matrix of the transformation matrix, which is the same as the transformation matrix),
124, 78, 84, 56 are obtained. In this way, the initial data "123" is altered into "124" through the Hadamard transformation and its reverse transformation. Thus, the Hadamard transformation to output the integer data does not guarantee the reversibility. In the following, the Hadamard transformation to output the integer data is called an integer type Hadamard transformation, and the integer type Hadamard transformation capable of making the reversible transformation is called an integer type reversible Hadamard transformation or a lossless Hadamard transformation.

Conventionally, the lossless four-point Hadamard transformation was realized in the following way.

(a) Decompose the four-point Hadamard transformation matrix $H_4$ into a product of triangular matrices with the diagonal elements "1", (b) Apply a row replacing operation Q on the original transformation matrix, and (c) Decompose $QH_4$ into a product of following matrices from the above (a) and (b).

[Expression 5]

$$QH_4 = \begin{bmatrix} 1 & 0 & 0 & 0 \\ 0 & 1 & 0 & 0 \\ 0 & -1 & 1 & 0 \\ -1 & 0 & 0 & 1 \end{bmatrix} \begin{bmatrix} 1 & 0 & 1/2 & 1/2 \\ 0 & 1 & 1/2 & -1/2 \\ 0 & 0 & 1 & 0 \\ 0 & 0 & 0 & 1 \end{bmatrix} \begin{bmatrix} -1 & 0 & 0 & 0 \\ 0 & -1 & 0 & 0 \\ 1 & 0 & 1 & 0 \\ 0 & -1 & 0 & 1 \end{bmatrix} \quad (5)$$

(d) Represent this transformation in a signal flow (as represented in FIG. 1), (e) Round the data after the decimal fractions that arises in multiplication operation in this signal flow to make the integer data.

The lossless four-point Hadamard transformation is implemented with the above items (a) to (e). Some supplementary explanation is given in the following.

The signal flow of FIG. 1 has a Ladder Network configuration which is often employed to implement a reversible transformation process. In this Ladder Network, the transformation process for outputting the integer data is made reversible by introducing a rounding process (200, 201 in FIG. 2) rounding the data to the output side of a multiplier 100, 101 in which the data after the decimal fractions is produced as a general method (in the field of reversible transformation process).

Herein, if the corresponding rounding process of the multiplication output is the same between the transformation process and the reverse transformation process, the content of the rounding process 200, 201 is arbitrary.

FIG. 2 shows a signal flow (capable of the reversible transformation) which is made reversible by introducing the rounding process into the signal flow of FIG. 1. This was a conventional arithmetical operation method for implementing the integer type reversible four-point Hadamard transformation.

A lossless 16-point Hadamard transformation is constructed by linking such lossless integer type reversible four-point Hadamard transformations at multistage. However, there is a dispersion in the average value of the error of each transformed output (a difference between mathematical transformation and lossless transformation) or the mean square error, giving rise to accurate transform coefficients and inaccurate transform coefficients.

Also, the conventional lossless two-dimensional DCT (Discrete Cosine Transformation) had a significant error of transformation with reference to the conventional two-dimensional DCT.

SUMMARY OF THE INVENTION

The present invention has been achieved in the light of the above-mentioned conventional example, and the feature of the invention is to provide an Hadamard transformation method and device in which the content of rounding process is set up so that the mean error occurring in the lossless Hadamard transformation process is theoretically zero to enhance the precision of transform coefficients.

According to the present invention, there is provided an Hadamard transformation method comprising: a first transformation step of transforming input signals using a four-point Hadamard transformation matrix in each of four four-point Hadamard transformation units; a first rounding step of rounding up the least significant bit of each of the odd number of four coefficients transformed by each of the four four-point Hadamard transformation units and discarding the least significant bit of each of the remaining odd number of the four coefficients, so as to produce the integer type of four sets of coefficients, each set including four coefficients; a second transformation step of selecting one coefficient from each one set of the four sets such that odd numbers of coefficients among the four selected coefficients for one set were rounded up in the first rounding step, and supplying the four selected coefficients to a four-point Hadamard transformation unit and transforming the four selected coefficients using a four-point Hadamard transformation matrix; and a second rounding step of rounding up the coefficients transformed in the second transformation step so as to cancel propagation errors to be superposed over the transformed coefficients.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4H depict diagrams showing eight types of lossless four-point Hadamard transformation as already proposed by the present inventor;

FIG. 9 depicts a block diagram showing the configuration of a lossless two-dimensional Hadamard transformation according to a second embodiment of the invention;

FIG. 14 depicts a table showing the comparison of the reverse transformation precision of the lossless two-dimensional DCT.

DETAILED DESCRIPTION OF THE PREFERRED EMBODIMENTS

The preferred embodiments of the present invention will be described below with reference to the accompanying drawings.

[First Embodiment]

Figure 3:
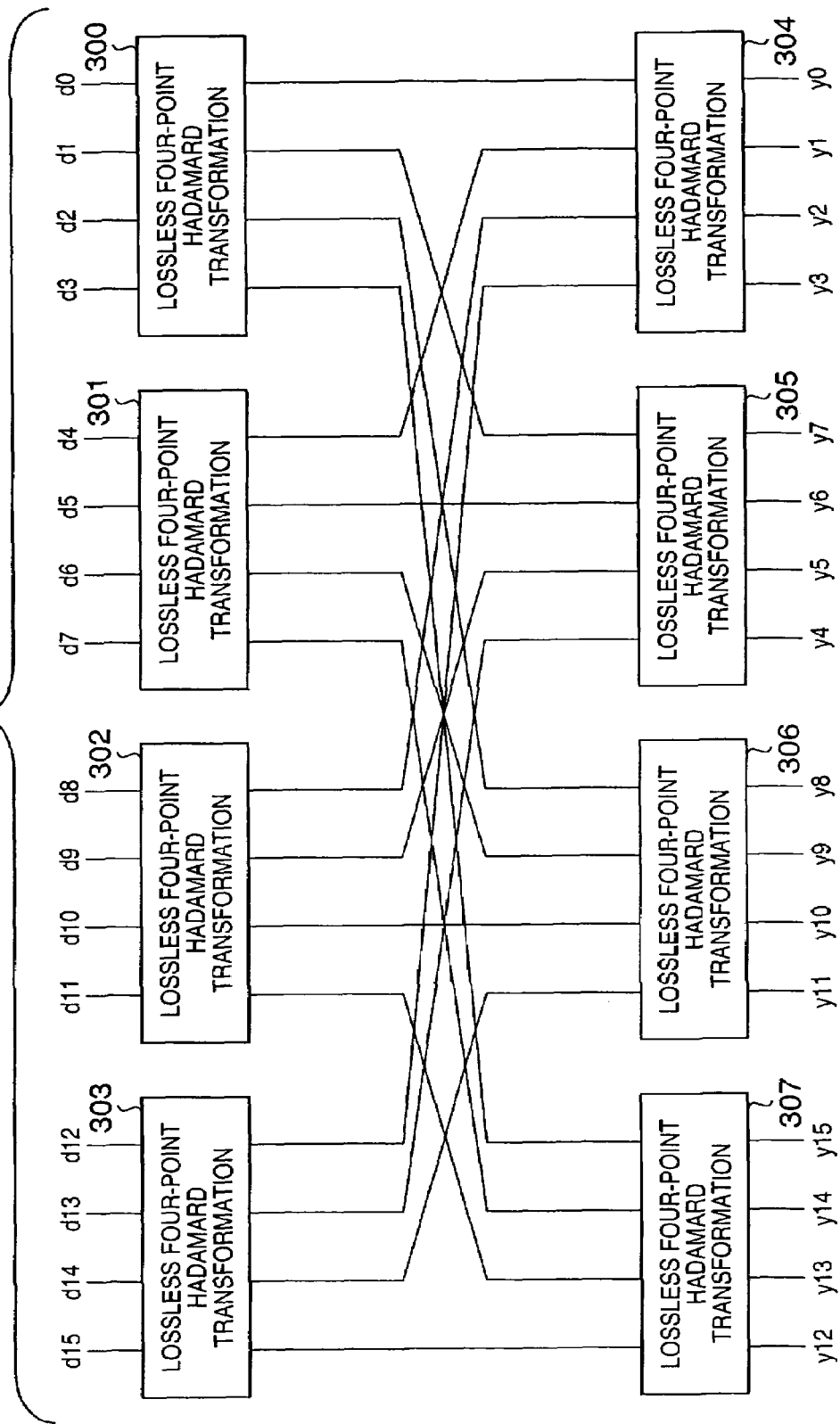
FIG. 3 depicts a block diagram showing the configuration of a lossless 16-point Hadamard transformation using lossless 4×4 Hadamard transformations.

FIG. 3 is a block diagram showing the configuration of the lossless 16-point Hadamard transformation using lossless 4×4 Hadamard transformations.

As shown in FIG. 3, the eight lossless four-point Hadamard transform sections 300 to 307 are linked at multi-stage. Herein, 16 pieces of input data (d0 to d15) are divided into four blocks, and each block is subjected to the lossless four-point Hadamard transformation by each of the lossless four-point Hadamard transform sections 300 to 303. Then, four transform coefficients at the same level in each transformation by the lossless four-point Hadamard transform sections 300 to 303 are gathered, and the four transform coefficients are subjected to the lossless four-point Hadamard transformation again by the lossless four-point Hadamard transform sections 304 to 307, respectively, to implement the lossless 16-point Hadamard transformation.

Figure 1:
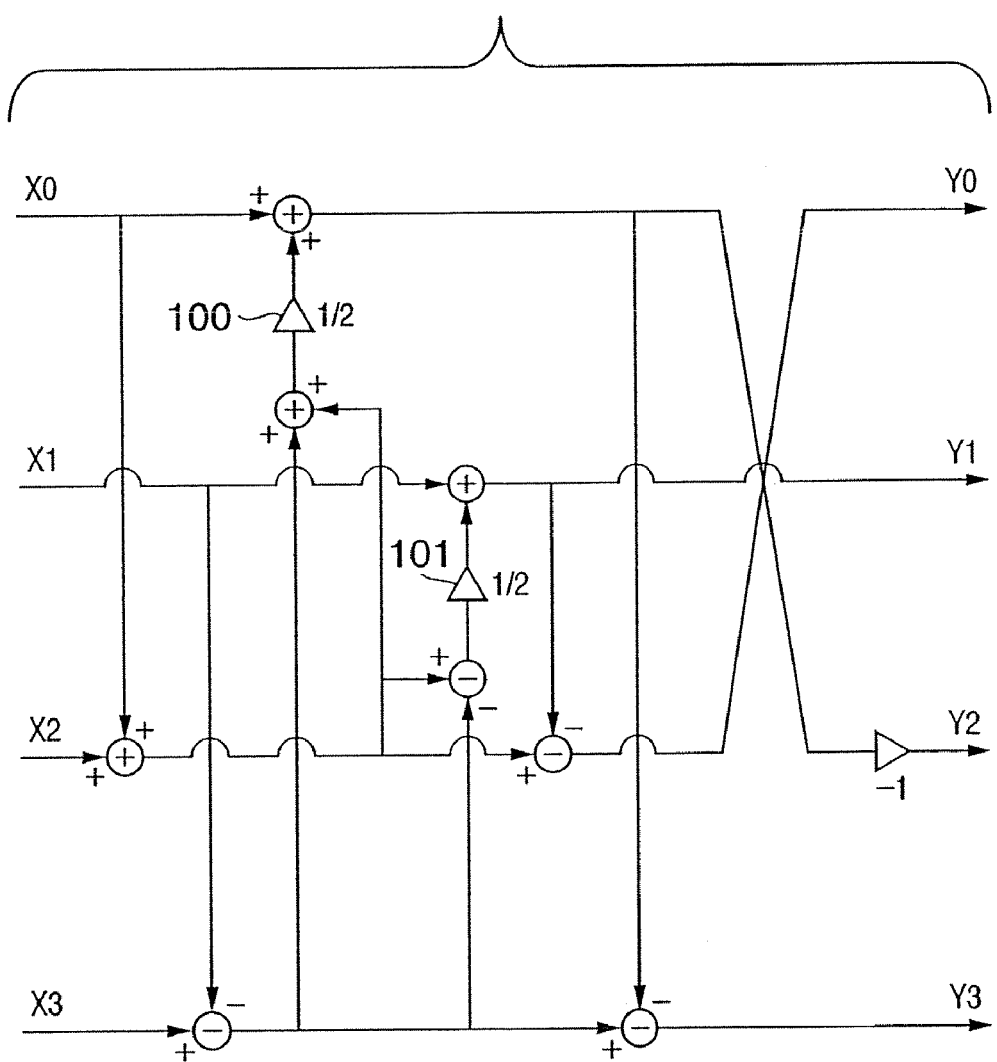
FIG. 1 depicts a diagram showing a signal flow that is a basis for implementing a conventional lossless 4×4 Hadamard transformation process.
Figure 2:
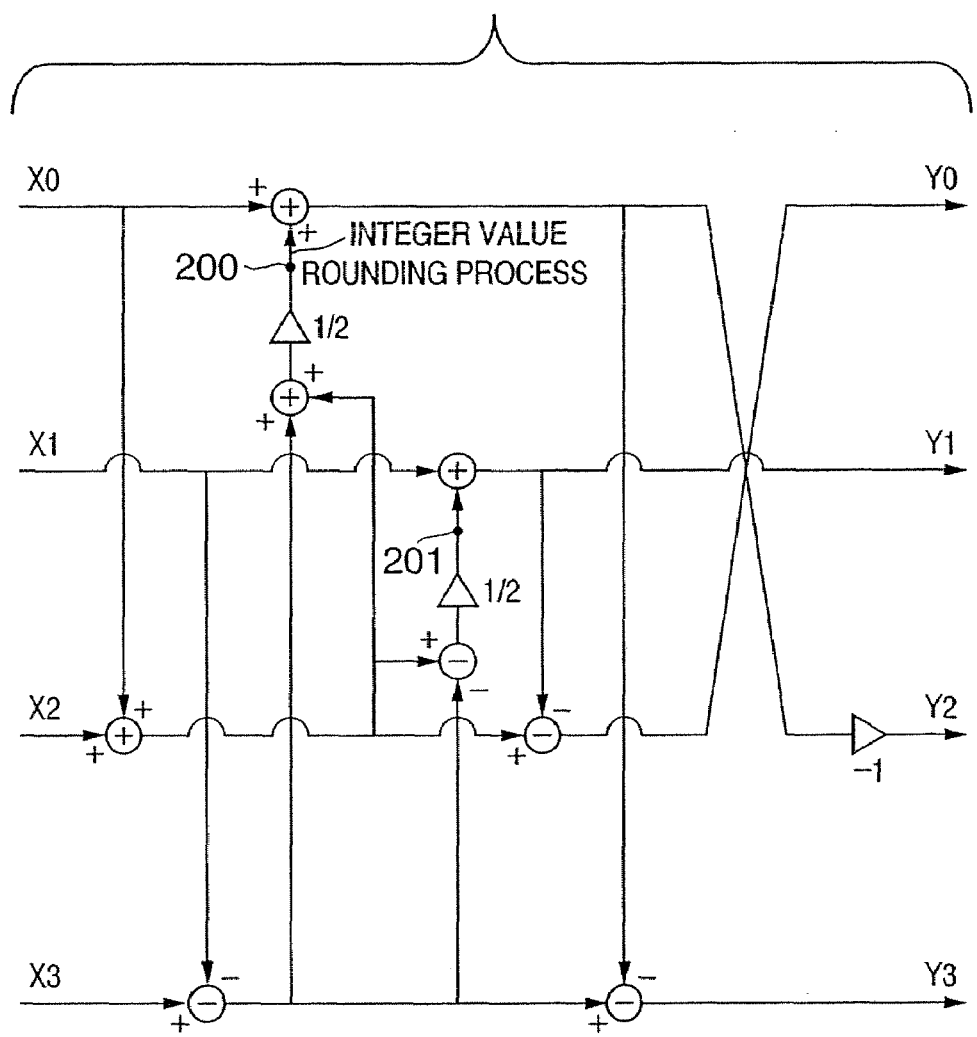
FIG. 2 depicts a diagram showing a signal flow of the conventional lossless 4×4 Hadamard transformation process.

Herein, the lossless four-point Hadamard transform sections 300 to 307 may employ the Hadamard transformation configuration as shown in FIG. 2, or may employ lossless Hadamard transformations with any one of eight types of rounding process described later.

Explaining simply, the eight types of the rounding process comprise rounding up the odd number of four transform coefficients and rounding down the remaining odd number of the four transform coefficients. In other words, one or three the four transform coefficients are rounded up and the remaining coefficients are rounded down.

FIGS. 4A to 4H depict diagrams showing the processings in eight types of lossless four-point Hadamard transform sections. Herein, the transformation process with the Hadamard transformation matrix according to the expression (3) or (4) is performed by each of the four-point Hadamard transform sections 410 to 417 at the former stage, and the rounding process is performed by 400 to 407 at the latter stage. Herein, the content of the rounding process is simply indicated as "+" and "−", in which "+" means the round-up and "−" means the round-down (discard). The round-up and round-down as used in this specification means the rounding up and discarding process on two's complement representation, but not the absolute value representation. For example, a complement representation of "−7.5" is "11111000.1", in which if this fraction part is rounded up, "11111001" (−7) results, and if it is rounded down, "11111000" (−8) results.

The reverse transformation is also one kind of lossless transformation. Its reason is that if the data after reverse transformation is transformed again, the data becomes equal to the data before the reverse transformation. Hence, the eight types of lossless four-point Hadamard transform sections 410 to 417, 400 to 407 as shown in FIGS. 4A to 4H shows also all types of reverse transformation. The correspondence between transformation and reverse transformation is different depending on the type of Hadamard transformation matrix (natural type or Walsh type).

The natural type has the following relationship between the transformation and the reverse transformation as indicated by drawing numbers.

(4A)→(4A);
(4B)→(4G);
(4C)→(4F);
(4D)→(4H);
(4E)→(4E);
(4F)→(4C);
(4G)→(4B);
(4H)→(4D)

Also, the Walsh type has the following relationship between the transformation and the reverse transformation as indicated by drawing numbers.

(4A)→(4A);
(4B)→(4F);
(4C)→(4H);
(4D)→(4G);
(4E)→(4E);
(4F)→(4B);
(4G)→(4D);
(4H)→(4C)

In natural type or Walsh type, the rounding process is adapted to cancel a propagation error in the reversed transformed data.

In the following description, the transformation matrix of Walsh type is employed, unless specifically noted.

The lossless 4×4 Hadamard transformation using any of the eight types of the rounding process as shown in FIGS. 4A to 4H may be equally applied in FIG. 3 to make the lossless 16-point Hadamard transformation. There are $8^8$ kinds of combinations. Thus, the following issues are imposed.

(A1) Make the mean error for each transform coefficient zero.

The random number without correlation is assumed as the input data. The lossless 16-point Hadamard transformation satisfying the issue (A1) is configured on the basis of the following conditions (B1) and (B2). (B1) For the four intermediate data input into each of the Hadamard transform sections 304 to 307 at the second stage (latter stage), the rounding process at the first stage is decided such that the odd number of data are rounded up, and the remaining odd number of data are rounded down. Then, the rounding process at the first stage is of course one of the eight types of rounding process.

(B2) Each of the Hadamard transform sections 304 to 307 at the second stage decides the type of rounding process to make the reverse transformation, grasping four input data as being generated from the same Hadamard transformation.

Of the four Hadamard transform sections 300 to 303 at the first stage, up to three Hadamard transform sections can freely decide the rounding process, but the remaining one has the rounding process uniquely decided if the condition (B1) is satisfied. Further, the four Hadamard transform sections 304 to 307 at the second stage uniquely decided if the condition (B2) is satisfied. In this way, the configuration to satisfy the conditions (B1) and (B2) is simply obtained, and has the 512 (=$8^3$) types.

Figure 5:
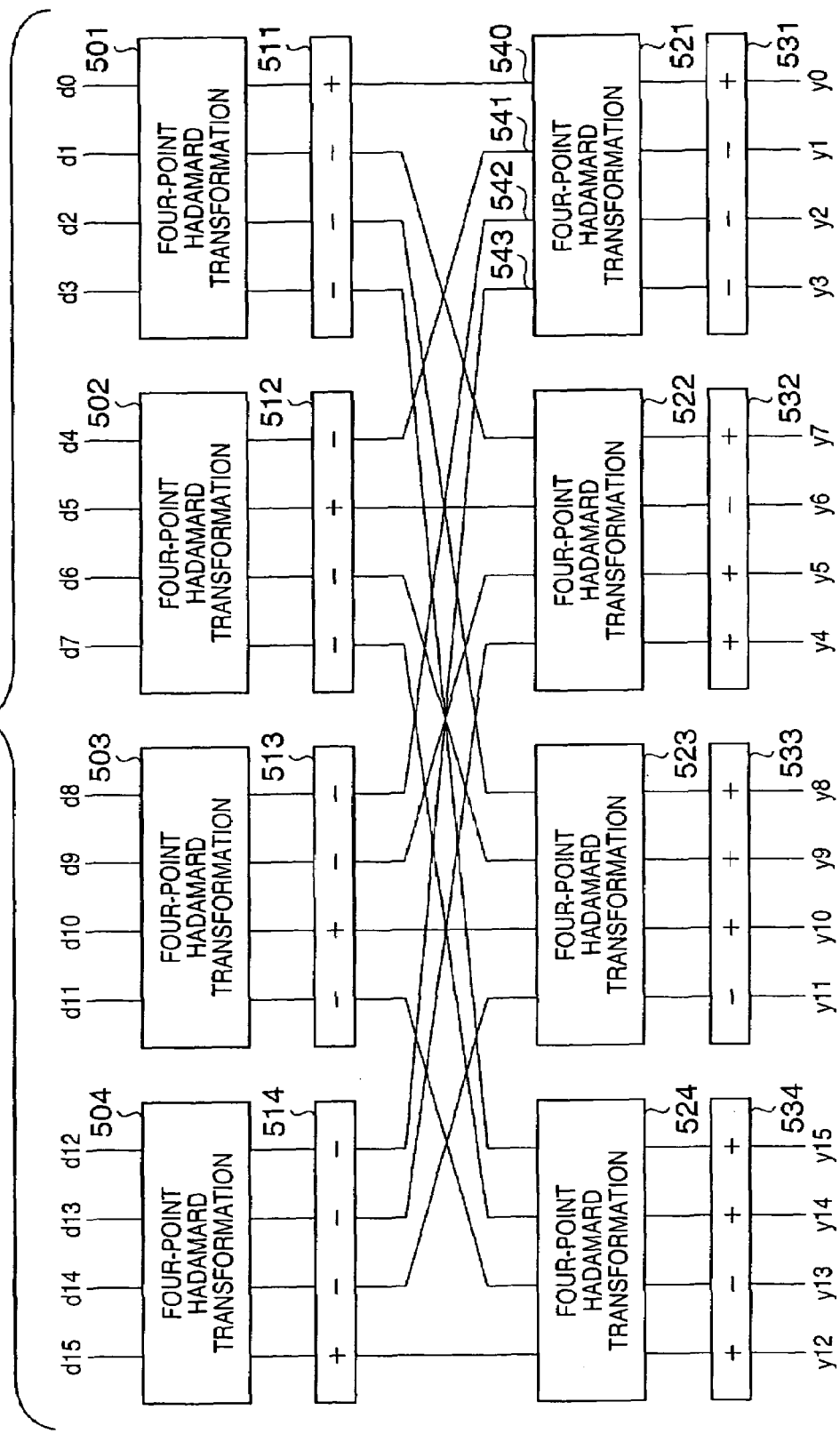
FIG. 5 depicts a block diagram showing the configuration of a lossless 16-point Hadamard transformation according to a first embodiment of the invention.

FIG. 5 depicts a block diagram showing the configuration of the lossless 16-point Hadamard transformation according to the first embodiment of the invention. The four-point Hadamard transform sections 501 to 504 and 521 to 524 in FIG. 5 have the same configuration as the four-point Hadamard transform sections 410 to 417 as shown in FIGS. 4A to 4H.

In FIG. 5, "+" in the rounding processes 511 to 514 and 531 to 534 denotes the round up, and "−" denotes the discard. In this example, seven types of rounding operation are employed among all the eight types of operations. When configured in this way, the mean error of arbitrary output becomes not only "0", but also the error distribution is the same, whereby the mean square error becomes equal. In the following, the reason why the mean error becomes "0" through the error distribution will be described.

In FIG. 5, four inputs (intermediate data) for each of the Hadamard transform sections 521 to 524 at the second stage have no correlation because they are not supplied from the same Hadamard transform section. For example, a superposed error in the input data into the Hadamard transform section 521 occurs at the same probability in all sixteen cases from (0, 0, 0, 0) to (+0.5, −0.5, −0.5, −0.5). In FIG. 5, the intermediate data 540 is the rounded up data of a transformed coefficient and contains a round-up error (+0.5) at a probability of ½, and the transformed coefficient is the integer and error free data at a probability of ½. For other three intermediate data 541 to 543, the rounding process is the discard, in which an error (−0.5) due to the discard occurs at a probability of ½ in each intermediate data, and each transformed coefficient is the integer and error free data at a probability of ½ in the same way as above.

Figure 6A:
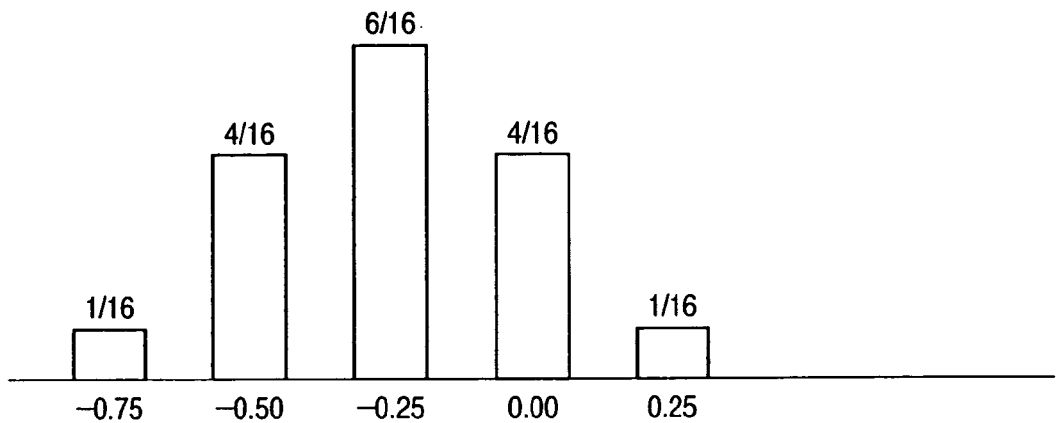
FIGS. 6A to 6C are graphs showing a transformation error distribution in the lossless 16-point Hadamard transformation process according to the first embodiment of the invention.

The values which are the product of ½ and the inner product between this superposed error and the first row of the transformation matrix in the expression (4), are distributed from the minimum "−0.75" to the maximum "0.25" at a step of "0.25". More particularly, the values of "−0.75", "−0.5", "−0.25", "0", and "+0.25" are distributed at the probabilities of "1/16", "1/4", "3/8", "1/4" and "1/16", respectively. FIG. 6A shows this distribution. If this distribution has "+0.5" added in a rounding process 531 after transformation process by the Hadamard transform section 521 at the second stage, the error distribution is as shown in FIG. 6B.

In this case, the probability that "+0.5" is added in the rounding process 531 after transformation process by the Hadamard transform section 521 at the second stage in FIG. 5 becomes equal to the probability that the least significant bit becomes "1", which is equal to ½.

Figure 6B:
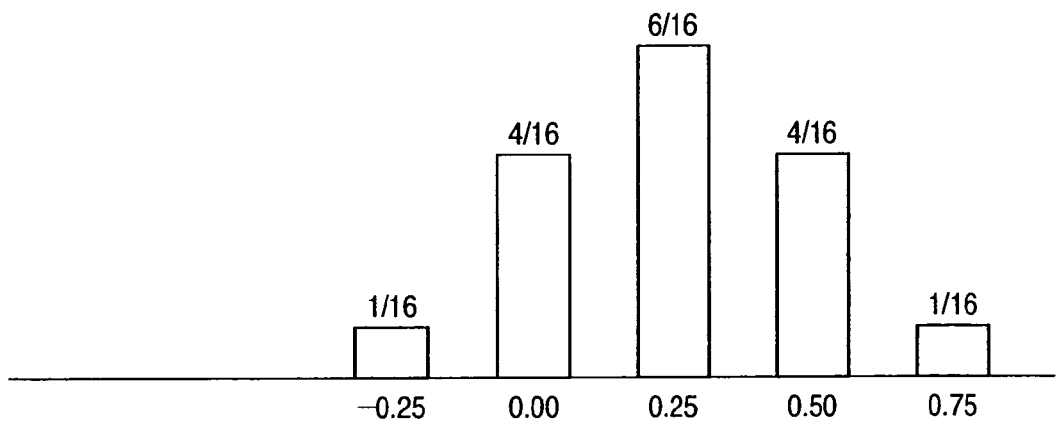
Figure 6C:
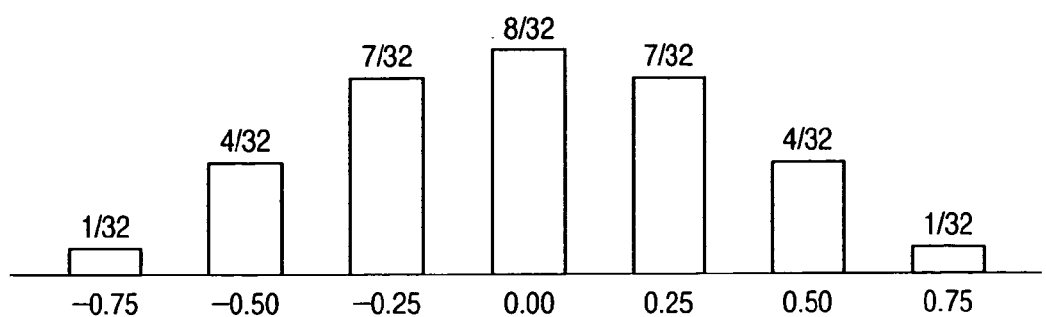

Accordingly, the distributions as shown in FIGS. 6A and 6B arise at the same probability of "½", respectively, and the overall error distribution is as shown in FIG. 6C. Also, the mean square error of this distribution is "0.125".

The values which are the product ½ and the inner product between the superposed error and the second, third and fourth row of the transformation matrix in the expression (4), are distributed from "−0.25" to "0.75" at a step of "0.25", in contrast to the distribution of FIG. 6A. Since the value added in the rounding process after the Hadamard transform section at the second stage is symmetrically "−0.5", the overall error distribution is symmetrical, resulting in the same distribution. The input data for other three Hadamard transformations have the same error distribution using the same calculation, though the distribution of superposed error is slightly different, whereby the mean error is "0" and the mean square error is "0.125". Consequently, the mean error becomes "0" and the mean square error becomes "0.125" in all the outputs y0 to y15 of FIG. 5.

Figure 7:
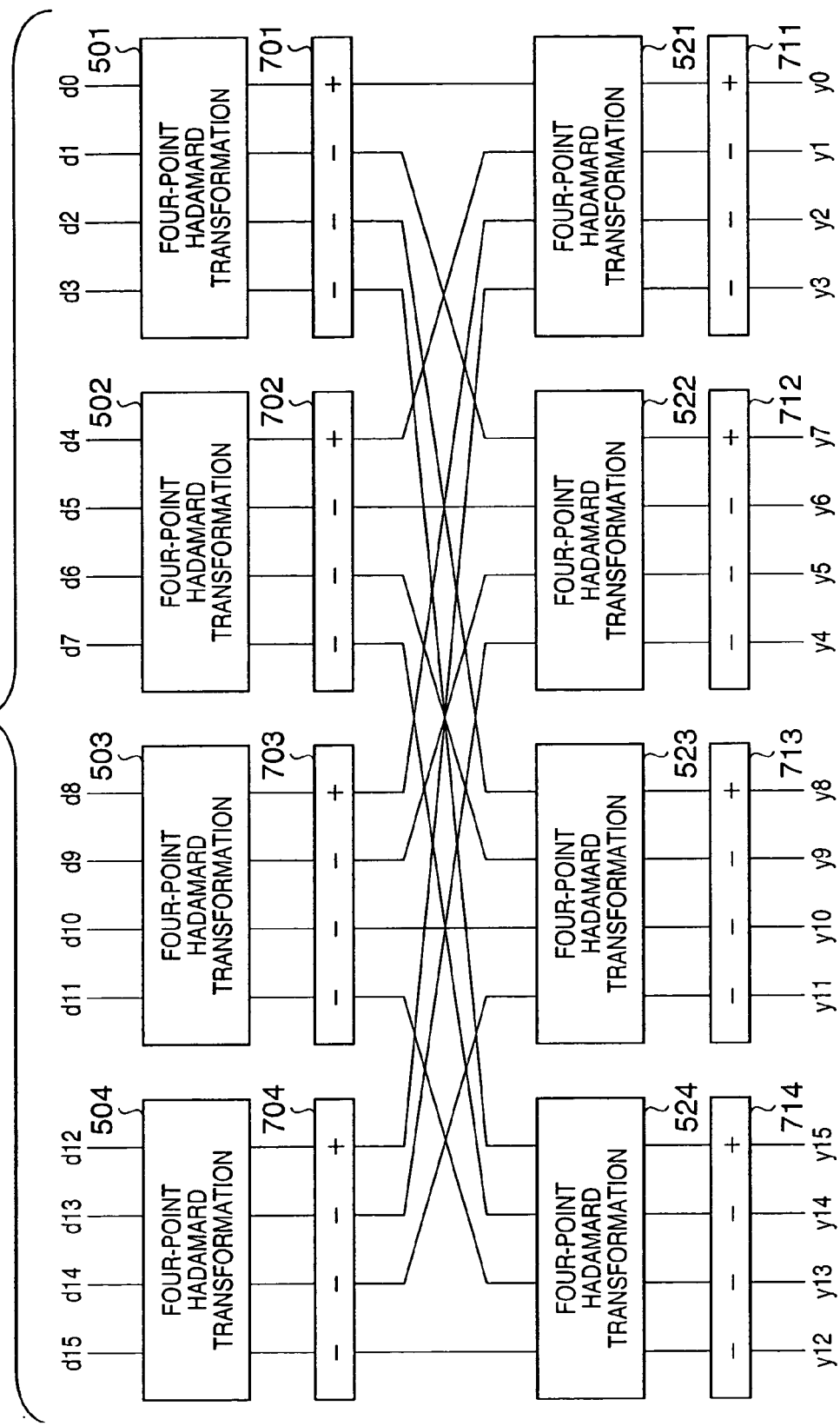
FIG. 7 depicts a diagram showing one example of the configuration in which the mean error in transformation is not zero in contrast to the lossless 16-point Hadamard transformation of FIG. 5 according to the first embodiment of the invention.

For reference, the configuration not satisfying the above condition (B1) is shown in FIG. 7, and the behavior of the mean error and the mean square error will be described below. The wirings in FIG. 7 are the same as in FIG. 5, but the rounding process is different.

Figure 8A:
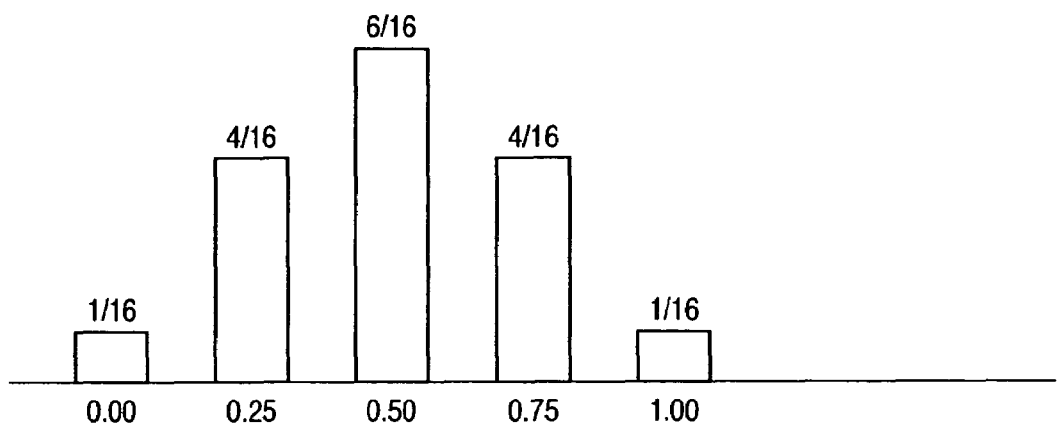
FIGS. 8A to 8C are graphs showing the transformation error distribution in the configuration of FIG. 7.
Figure 8B:
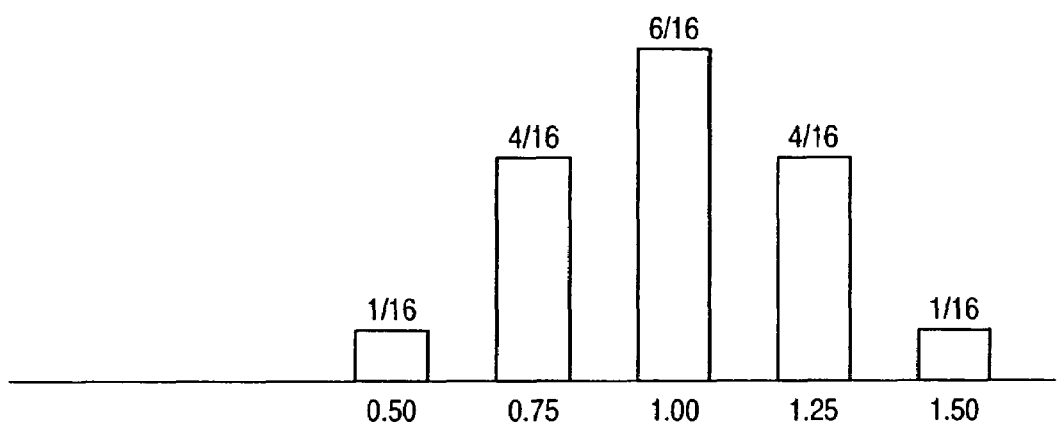
Figure 8C:
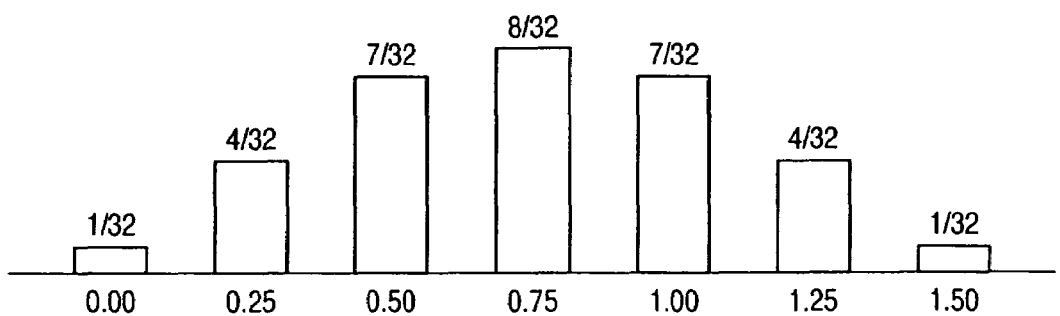

In FIG. 7, since four input data of the Hadamard transform section 521 at the second stage are all the rounded up data, its superposed error is deviated in + direction such as (0, 0, 0, 0) to (+0.5, +0.5, +0.5, +0.5). Therefore, the values which are the product of ½ and the inner product between the superposed error and the first row of the transformation matrix in the expression (4), have a distribution as shown in FIG. 8A. Thereafter, if "+0.5" is further added in a rounding process 711, the error distribution is as shown in FIG. 8B, and the overall error distribution is as shown in FIG. 8C. Hence, the mean error of output y0 becomes "0.75", and the mean square error becomes "0.6875". However, the error distribution is the same as in FIG. 6C, with its variance being "0.125". Herein, the mean square error, which is {(mean error)$^2$ +variance}, becomes larger because the mean error is not "0".

In FIG. 7, the error superposed on any of the outputs y0 to y15 has the same distribution, with its variance being "0.125". In this way, the mean error is different depending on the output, and the mean square error is varied accordingly. All the outputs are classified into the following three groups, according to the mean error and the mean square error.

Mean error=0.75, mean square error=0.6875: y0

Mean error=0.25, mean square error=0.1875: y7, y8, y15

Mean error=−0.25, mean square error=0.1875: others

If the lossless 16-point Hadamard transformation is configured without satisfying the above condition (B1), the errors are superposed as above example.

The lossless 16-point Hadamard transformation according to this embodiment can be easily implemented by the software processing. Each Hadamard transform section of real type can be implemented with the fixed point operation or floating point operation, and the rounding process can be performed in such a way that for rounding up, "0.5" is added and the floor function is acquired, and for rounding down, the floor function is acquired without addition, whereby the equivalent operation for the configuration of FIG. 5 can be made by the software processing.

[Second Embodiment]

In the lossless 16-point Hadamard transformation implemented in the first embodiment, in a case where the input data is regularly arranged in a 4×4 matrix, the lossless two-dimensional Hadamard transformation is realized for the 4×4 two-dimensional data. As a preparation before showing the configuration for the two-dimensional process, the mathematical notation is simplified as shown in the following expression (6).

[Expression 6]

$$\left[\begin{bmatrix} + & - & - & - \\ - & + & - & - \\ - & - & + & - \\ - & - & - & + \end{bmatrix}\right]\frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix}\begin{bmatrix} d0 & d4 & d8 & d12 \\ d1 & d5 & d9 & d13 \\ d2 & d6 & d10 & d14 \\ d3 & d7 & d11 & d15 \end{bmatrix} \quad (6)$$

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix} \times \frac{1}{2} \begin{bmatrix} + & - & - & - \\ + & - & + & + \\ + & + & + & - \\ + & - & - & + \end{bmatrix}$$

In this expression (6), the first (leftmost) and the fifth (rightmost) matrices composed of "+" and "−" signs represent the contents of the rounding process. Herein, each symbol has the same meaning as "+" and "−" in FIGS. 4A to 4H. First, the arithmetical operation is made between the second and third matrices from the left, the rounding process as defined in the first matrix is performed after multiplying the factor ½. Then, the arithmetical operation with the fourth matrix is made, and the rounding process of the last matrix is made after multiplying the factor ½. In the non-linear arithmetical operation, if the order of operation is changed, the characteristics are changed. In this case, unless the rounding operation for the leftmost matrix is firstly performed, the mean error becomes non "0".

The transformation in the expression (6) is one example, and there are 512 types of transformations in which the mean error becomes "0" as already described. There is a difference only between the leftmost and rightmost matrices representing the content of the rounding process. Hence, the lossless 4×4 two-dimensional Hadamard transformation (lossless 16-point Hadamard transformation) are defined by expressing the two matrices.

On the other hand, the configuration for implementing this lossless 16-point Hadamard transformation two-dimensionally is shown in FIG. 9. Herein, every four data is processed in a vertical direction, and its results are transposed and processed in a horizontal direction. The order of processing may be reversed.

FIG. 9 depicts a block diagram showing the configuration of the lossless two-dimensional Hadamard transformation according to the second embodiment of the invention.

In FIG. 9, numerals 901 and 911 denote Hadamard transform sections for making the Hadamard transformation process on the basis of the transformation matrix of the expression (3) or (4). Numeral 903 and 913 denote decoders for generating the addition data to be rounded up in accordance with the column number and the row number of the two-dimensional data to be processed. Numerals 905 and 915 denote adder sections for making the adding process for rounding up. Numeral 907 and 917 denote discard sections for discarding the fraction part, and numeral 909 denotes a buffer for temporarily storing the 4×4 two-dimensional data to be transposed (rearranged).

The discard sections 907 and 917 for discarding the fraction part are provided on the process concept, but actually implemented by disconnecting the signal line of the fraction part and outputting the integer part only.

First of all, four data in the first column are input in parallel into the Hadamard transform section 901. Herein, the transformation process is performed in accordance with the transformation matrix of the expression (3) or (4). Since the rounding process on the reverse transformation side is varied by the transformation matrix, the Walsh type Hadamard transformation matrix of the expression (4) is employed. The data transformed in this Hadamard transform section 901 is the data having the fraction part of one bit, and passed to the adder section 905.

On the other hand, the decoder 903 generates the addition data for rounding up on the basis of the input column number information, and supplies it to the adder section 905. That is, the addition data (1, 0, 0, 0), (0, 1, 0, 0), (0, 0, 1, 0) and (0, 0, 0, 1) are generated for "1", "2", "3" and "4" that are input as the column number and passed to the adder section 905. These addition data correspond to the column vector of the matrix at the leftmost location in the expression (6), in which "+" and "−" are replaced with "1" and "0", respectively.

The addition data for rounding up is added to the fraction part of the transformed data in the adder section 905. Hence, the weight of the addition data is set to "0.5". And the next discard section 907 discards the fraction part, whereby the rounding process is completed. Herein, when the fraction part of the transformed data is "0", the rounding process performed in the adder section 905 and the discard section 907 has no influence on the transformed data. However, when the fraction part of the transformed data is "1", the transformed data to which "0.5" is added is rounded up, and the other data is discarded.

If the column numbers of four data to be processed are changed, the addition data for rounding up is correspondingly changed, whereby the rounding process for each column number is changed. In this way, the data that has been subjected to the lossless Hadamard transformation is saved in the buffer 909. This buffer 909 is so small as to transpose the 4×4 data, and may be easily constructed by a register, for example.

If the lossless transformation process for four columns (column number 4) of data is ended, the data is transposed in the buffer 909 and output as the row data. This row data is subjected to the lossless Hadamard transformation, employing the four-point Hadamard transform section 911, the decoder 913, the adder 915 and the discard section 917. The decoder 913 outputs the addition data corresponding to the row vector in the rightmost matrix of the expression (6). Thereby, the mean error of transformed data after the lossless two-dimensional Hadamard transformation becomes "0", and the mean square error becomes "0.125".

[Modification to the Second Embodiment]

The two adder sections 905 and 915 may be configured to output different data depending on the value of the least significant bit (equal for four data) of the four data output from the corresponding Hadamard transform sections 901 and 911. That is, the adder sections 905 and 915 receives the least significant bit, and outputs the addition data of four "0" when the least significant bit is "0", or outputs "0.5" or "−0.5" when the least significant bit is "1". In other words, the adder sections 904 and 915 receives the least significant bit (L), and outputs (0.5×L) or (−0.5×L). The same process as the rounding process as previously described may be performed for the output from the adder sections 905 and 915.

[Third Embodiment]

This third embodiment is the lossless two-dimensional DCT (Discrete Cosine Transformation), employing the 4×4 lossless two-dimensional Hadamard transformation as described in the second embodiment. The lossless DCT was firstly realized in the following document 1. (Document 1) Kuninori Komatsu and Kaoru Sezaki, "Reversible Discrete Cosine Transformation and its Application to Image Information Compression", Shingaku Giho IE97-83, p.1-6, November 1997.

In this document 1, it is pointed out that because the Hadamard transformation is not used, a great number of multiplications are performed. As seen from the transformation matrix of the expression (3) or (4), the four-point Hadamard transformation is implemented only by addition and subtraction and the bit shift, and has no need for the multiplication. Though the rounding process is increased with the lossless transformation, it is only necessary to perform the addition to deal with the rounding up process, using the arithmetical operation method according to this invention.

Also, the lossless DCT using the lossless four-point Hadamard transformation has been offered in the following document 2. The lossless four-point Hadamard transformation as used herein has the configuration of FIG. 2. (Document 2) Shinji Fukuma, Koichi Oyama, Masahiro Iwabashi and Noriaki Kamibayashi, "Lossless 8-point Fast Discrete Cosine Transformation Applying Lossless Hadamard Transformation", Shingaku Giho IE99-65, p.1-6, December 1999.

Figure 10:
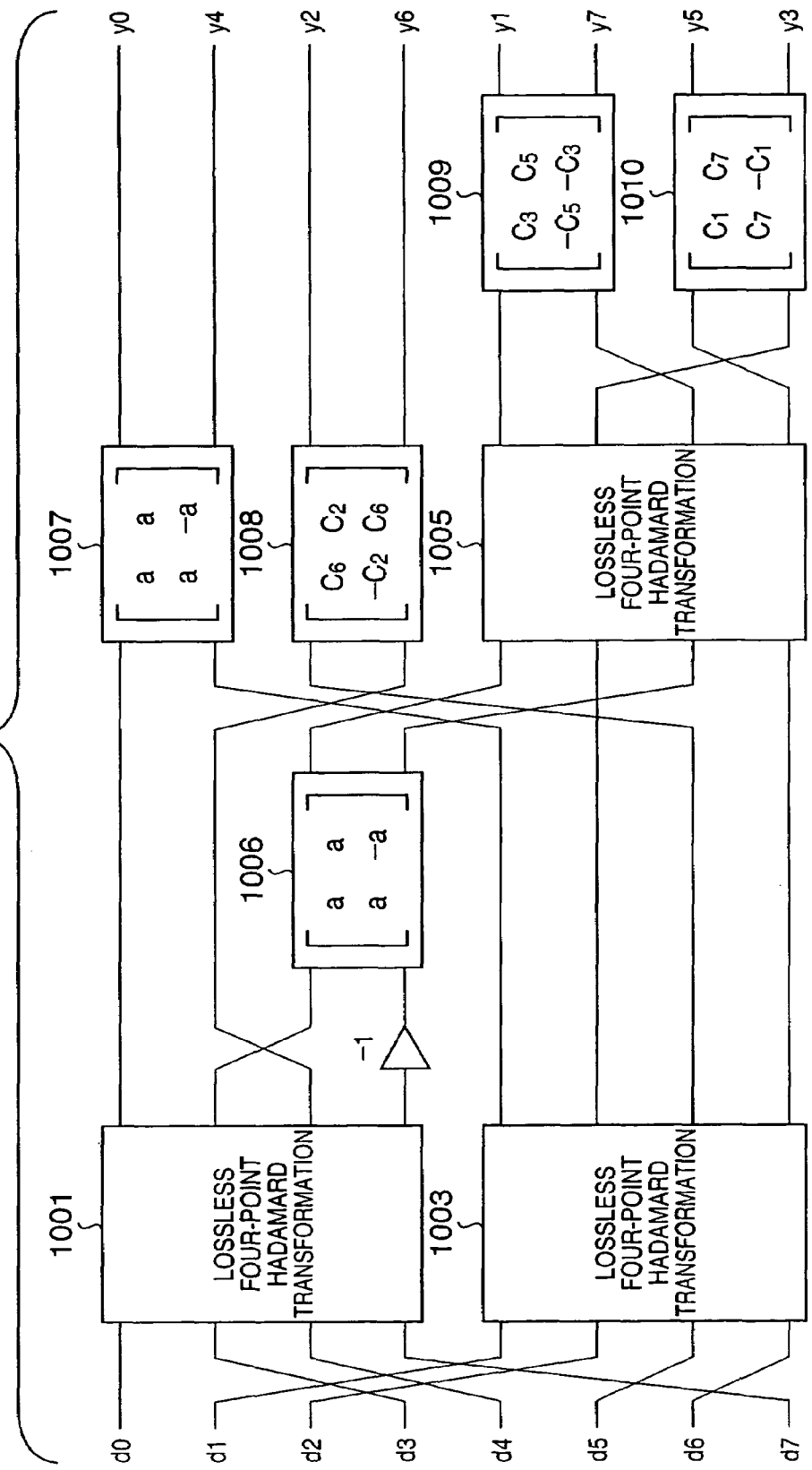
FIG. 10 depicts a diagram showing the configuration of a lossless DCT as described in document 2.

FIG. 10 depicts a block diagram showing the configuration of the lossless DCT as described in this document 2.

In FIG. 10, reference numerals 1001, 1003 and 1005 denote the lossless four-point Hadamard transform sections, and the two-input and two-output blocks 1006 to 1010 are rotation units for rotating the two-dimensional vector on the plane. The rotation units 1006 to 1010 are configured as lossless rotation units with a Ladder Network as described in the document 2. All the units are made lossless (reversible), whereby the entire DCT becomes lossless (reversible) to be able to make the lossless DCT process. This configuration is only shown with the one-dimensional transformation.

Figure 11:
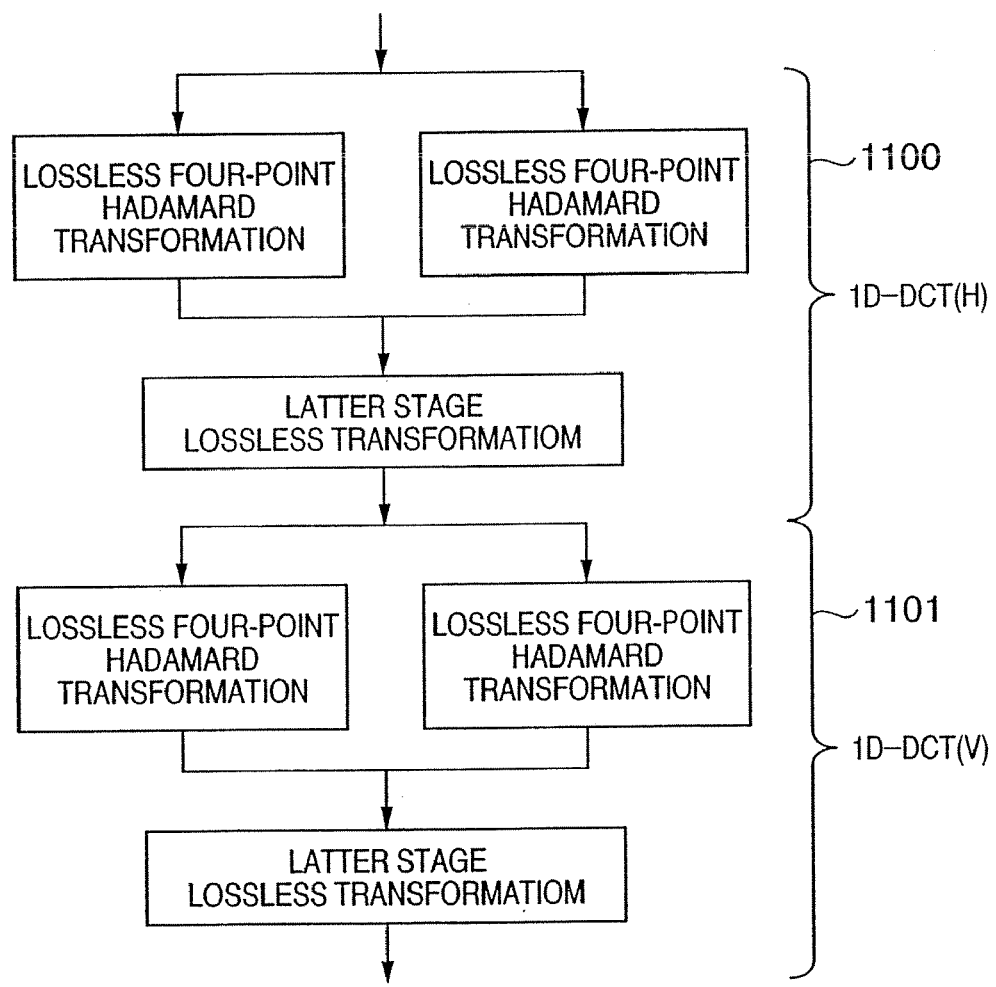
FIG. 11 depicts a block diagram showing the configuration of a conventional lossless two-dimensional DCT.

When the two-dimensional DCT is performed, it is common that the one-dimensional DCT is processed separately in the horizontal and vertical directions, as shown in FIG. 11.

FIG. 11 depicts a block diagram showing the configuration of a conventional lossless two-dimensional DCT.

In this arithmetical operation order, the lossless two-dimensional Hadamard transformation is not performed. Its reason is that a horizontal Hadamard transformation process 1100 and a vertical Hadamard transformation process 1101 are separated. Therefore, it is almost meaningless that the mean error is made zero. In the arithmetical operation order of the two-dimensional DCT in FIG. 11, the latter process in the horizontal direction and the lossless Hadamard transformation process in the vertical direction may be exchanged, and performed in the order as shown in FIG. 12, enabling the complete two-dimensional Hadamard transformation to be made, whereby the new lossless two-dimensional DCT using the lossless two-dimensional Hadamard transformation is implemented.

Figure 12:
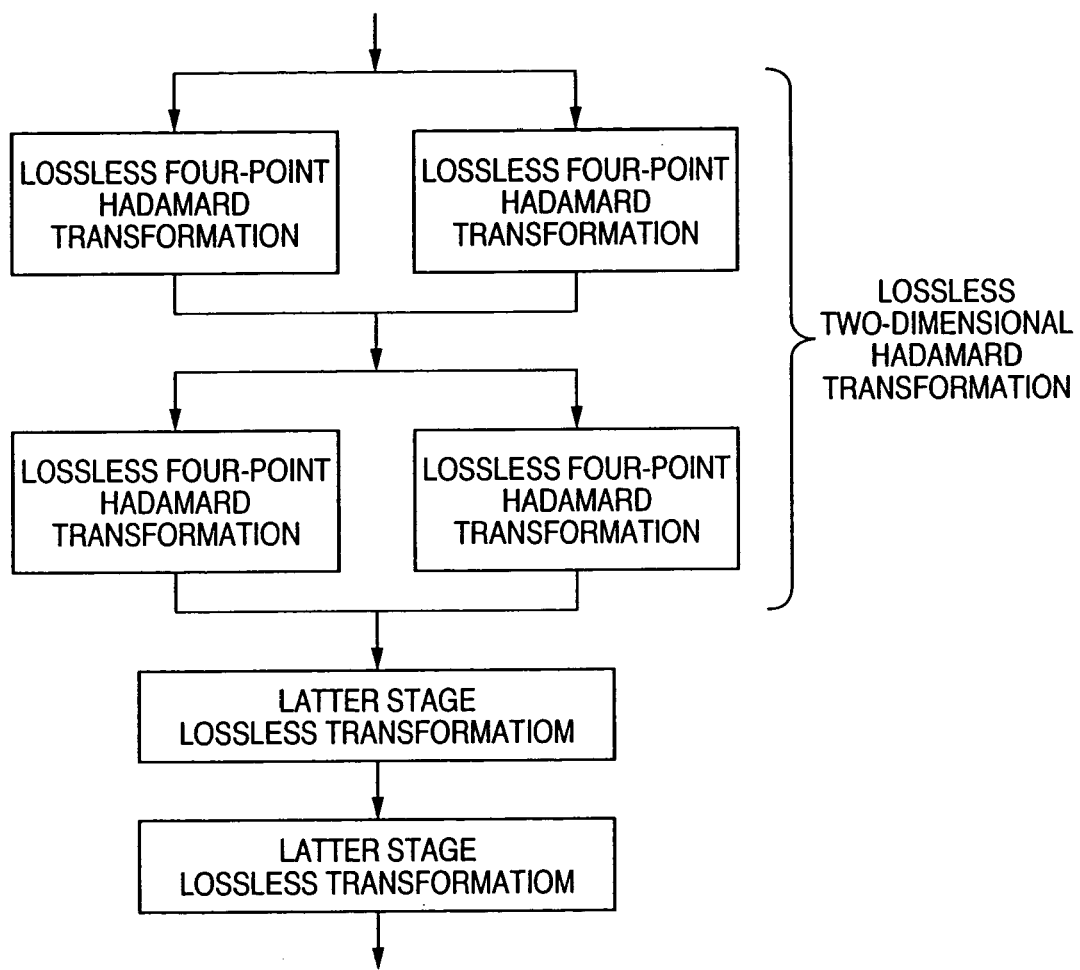
FIG. 12 depicts a block diagram showing the configuration of a lossless two-dimensional DCT according to a third embodiment of the invention.

FIG. 12 depicts a diagram showing the configuration of a lossless two-dimensional DCT according to a third embodiment of the invention.

FIGS. 11 and 12 show the software process in the processing order, in which these figures are not in the flowchart format but closest to the flowchart, and the corresponding flowcharts are omitted.

Figure 13:
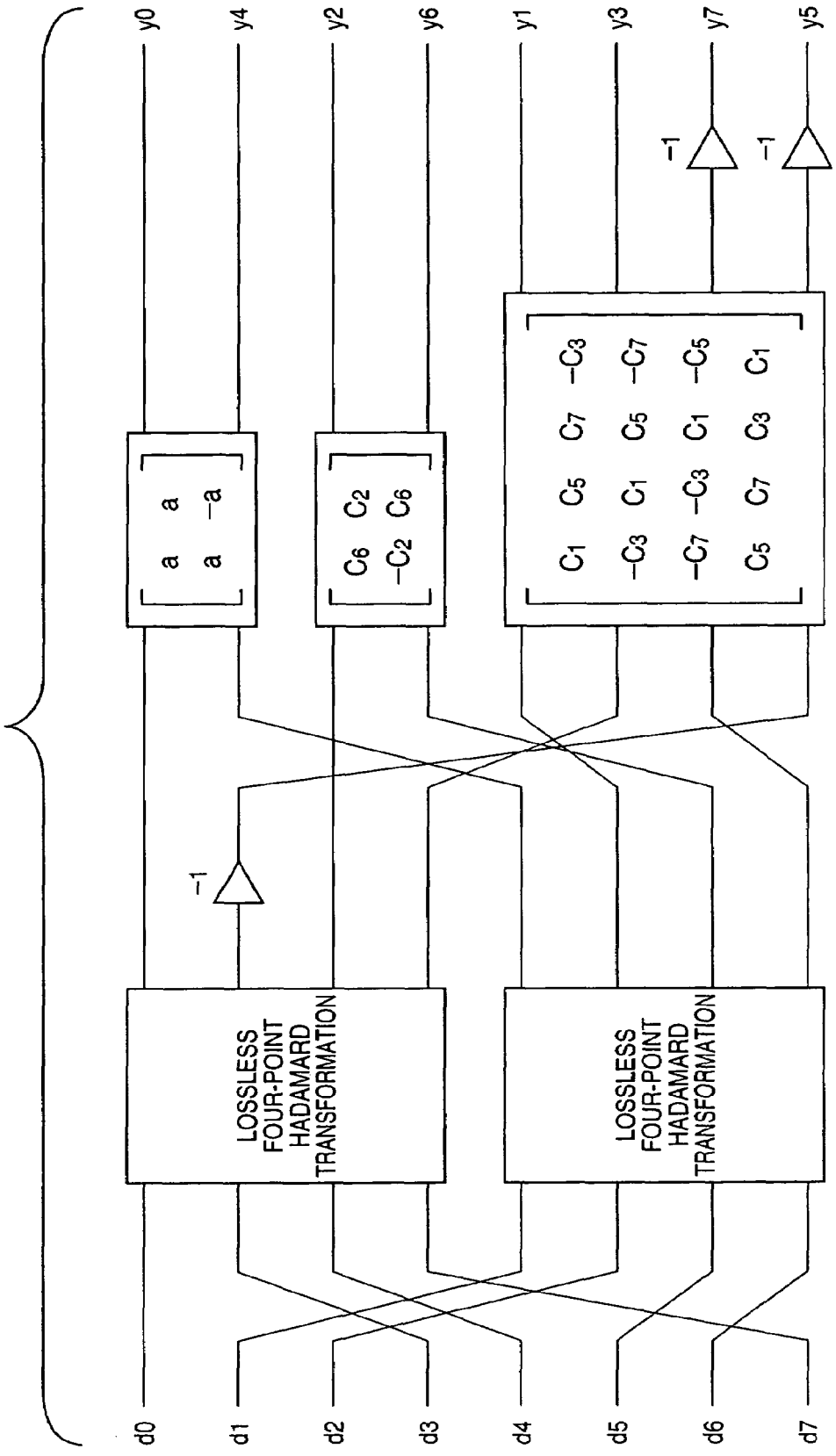
FIG. 13 depicts a diagram showing the configuration of a one-dimensional DCT that is effective for the lossless two-dimensional DCT according to the third embodiment of the invention.

Though the configuration as shown in FIG. 10 enables the process to be made in the order as shown in FIG. 12, it is also possible to make the process with the configuration as shown in FIG. 13 in the order of FIG. 12.

FIG. 13 depicts a diagram showing the configuration of the one dimensional DCT that is effective for the lossless two-dimensional DCT of FIG. 12. In FIG. 13, the lossless Hadamard transformation process with two lossless four-point Hadamard transform sections at the former stage employs the technique as described in the document 2, while the lossless transformation process at the latter stage includes a slight variation of the technique of the document 1. When the process is performed in the order of FIG. 12, a configuration of FIG. 13 has a great effect. In evaluating the transformation precision as will be described later, the configuration of FIG. 13 is employed.

The transformation precision of the lossless DCT is problematical in respect of the compatibility. That is, the code compressed using the lossless DCT is decoded by the decoder using the conventional lossy DCT, there occurs a signal degradation due to miss match of DCT besides the compression. And this signal degradation is more predominant for the higher image quality compression with higher compression ratio.

FIG. 14 depicts a table showing the reverse transformation precision of the lossless two-dimensional DCT according to this embodiment. For reference, the precisions of the lossless two-dimensional DCTs as described in the documents 1 and 2 are shown for comparison. The precision as shown in FIG. 14 is calculated on the basis of the specification of reverse transformation precision for the DCT in the ITU-T H. 261 standard.

As will be clear from FIG. 14, in the lossless two-dimensional DCT according to this embodiment, the total pixel mean value of mean square errors and the maximum value for the pixels are closer as compared with the methods of the above documents. This means that there is a less dispersion in the mean square error between pixels, and all the pixels are degraded almost uniformly. The total pixel mean value of the mean square errors in this embodiment is decreased to about "$2/3$" to "$1/2$" as compared with the documents 1 and 2, but the maximum value of the mean square error is decreased to about "$1/3$" to "$1/3.7$" as compared with the documents 1 and 2. Moreover, the mean error has the similar trend. That is, in this embodiment, the total pixel mean value is doubled or more as compared with the document 1, but the maximum value is conversely decreased to about 60%.

In this way, with this embodiment, the precision is improved for all the items, except for the mean error over all the pixels.

In the embodiments, examples of the two-dimensional DCT using the two-dimensional Hadamard transformation are described, but upon two-dimensional Discrete Cosine Transforming 8×8 block data, the 8×8 block data may be segmented into four 4×4 block data and each 4×4 block data may be two-dimensional transformed using the two-dimensional Hadamard transformation.

This invention may be applied to the system consisting of a plurality of apparatuses (e.g., host computer, interface unit, reader, and printer), or to a single apparatus (e.g., copying machine, and facsimile).

In the embodiments, the Hadamard transformations are implemented using a hardware, but those may be implemented using a software.

Also, the object of the invention is achieved by supplying a storage medium (recording medium) recording a software program code for implementing the functions of the embodiment to the system or apparatus, and reading and executing the program code stored in the storage medium in a computer (or CPU or MPU) of the system or apparatus. In this case, the program code itself read from the storage medium implements the functions of the embodiment, and the storage medium storing the program code constitutes the invention. The functions of the embodiment are implemented when the computer reads and executes the program code. However, the functions of the embodiment may be also implemented when an operating system (OS) of the computer performs a part or all of the process upon an instruction of the program code.

Moreover, the functions of the embodiment may be implemented in such a way that the program code read from the storage medium is written into a function extension card inserted into the computer or a memory equipped for the function extension unit connected to the computer, and the CPU provided for the function extension card or function extension unit performs a part or all of the actual process upon an instruction of the program code.

As described above, according to the first embodiment, to construct the lossless 16-point Hadamard transformation, using the 4×2 stage lossless four-point Hadamard transformation, the rounding process at the first stage is configured such that for four intermediate data inputted into the Hadamard transformation at the second stage, the odd number of data is rounded up, and the remaining odd number of data is rounded down, and the rounding process at the second stage is configured such that the Hadamard transformation at the second stage makes the reverse transformation, grasping four input data as coming from the same Hadamard transformation.

Thereby, the mean error of transform coefficients after the lossless transformation can be "0". Also, the lossless two-dimensional Hadamard transformation for 4×4 data in which the mean error of transform coefficients becomes "0" is realized.

Moreover, if the 4×4 lossless two-dimensional Hadamard transformation is performed in the arithmetical operation process of the lossless two-dimensional DCT, the transformation precision of the lossless two-dimensional DCT can be improved over the conventional method.

Also, in the two-dimensional lossless transformation device, the rounding process may be changed depending on the row or column number of the two-dimensional data to be processed, whereby the transformation precision is improved.

Moreover, if the lossless two-dimensional Hadamard transformation is performed in the arithmetical operation process of the lossless two-dimensional DCT, the lossless two-dimensional DCT with high transformation precision can be realized.

The present invention is not limited to the above embodiments and various changes and modifications can be made within the spirit and scope of the present invention. Therefore to apprise the public of the scope of the present invention, the following claims are made.

What is claimed is:

1. A Hadamard transformation method for processing image data, comprising:

executing computer program steps according to a program stored on a computer-readable medium, said steps including a first transformation step of transforming image input signals using a four-point Hadamard transformation matrix in each of four four-point Hadamard transformation units;

a first rounding step of rounding up the least significant bit of each of the odd number of four coefficients transformed by each of said four four-point Hadamard transformation units and discarding the least significant bit of each of the remaining odd number of the four coefficients, so as to produce the integer type of four sets of coefficients, each set including four coefficients;

a second transformation step of selecting one coefficient from each one set of the four sets such that odd numbers of coefficients among the four selected coefficients for one set were rounded up in said first rounding step, and supplying the four selected coefficients to a four-point Hadamard transformation unit and transforming the four selected coefficients using a four-point Hadamard transformation matrix; and a second rounding step of rounding up the coefficients transformed in said second transformation step so as to cancel propagation errors to be superposed over the transformed coefficients.

2. A method according to claim 1, wherein the coefficient is decreased by the discarding and the coefficient is increased by the rounding up.

3. A computer readable storage medium having stored thereon the program that executes the Hadamard transformation method according to claim 1.

4. A Hadamard transformation device for processing image data, comprising:

a computer program stored on a computer-readable medium, for controlling said device;

first transformation means, having four four-point Hadamard transformation units, for transforming image input signals with a four-point Hadamard transformation matrix in each of the four four-point Hadamard transformation units;

first rounding means for rounding up the least significant bit of each of the odd number of four coefficients transformed by each of said four four-point Hadamard transformation units and discarding the least significant bit of each of the remaining odd number of the four coefficients so as to produce the integer type of four sets of coefficients, each set including four coefficients;

second transformation means for selecting one coefficient from each one set of the four sets such that odd numbers of coefficients among the four selected coefficients for one set were rounded up by said first rounding means, and supplying the four selected coefficients to the four-point Hadamard transformation unit and transforming the four selected coefficients using the four-point Hadamard transformation matrix; and second rounding means for rounding up the coefficients transformed by said second transformation means so as to cancel propagation errors to be superposed over the transformed coefficients.

5. A Hadamard transformation device for transforming image data comprising:

a computer-readable medium, having data storage thereon including 4×4 block image data in two dimensions including horizontal and vertical directions;

a first transform unit adapted to perform a Hadamard transformation on input image data in a unit of four items of the input data, and to output first transformed coefficients;

a first decoder adapted to generate first data to be added for rounding process based on a row number or a column number of the 4×4 block data;

a first adder adapted to add the first transformed coefficients to the first added data from said first decoder;

a first discarding unit adapted to discard the lease significant bit of an output of said first adder;

a buffer adapted to store data processed in said first transform unit, said first decoder, said first adder and said first discarding unit, and be used for transporting the data;

a second transform unit adapted to input outputs of said buffer and perform an Hadamard transformation on the outputs in units of four items of the outputs, and output second transformed coefficients;

a second decoder adapted to generate second data to be added for rounding process based on a row number or a column number of the 4×4 block data;

a second adder adapted to add the second transformed coefficients to the second added data from the said second decoder; and a second discarding unit adapted to discard the lease significant bit of an output of said second adder, wherein the first data from first decoder has odd number of "1"s and the remaining of the first added data included "0"s, and the second data from second decoder is used to cancel propagation errors superposed over the second transformed coefficients.

6. A Hadamard transformation device according to claim 5, wherein said first and second adders output four items of data including "0" or "0.5".

7. A Hadamard transformation device according to claim 5, wherein said first and second adders input the least significant bit of the first or second transformed coefficients, respectively, and output four items of data including "0.5" or "−0.5" in a case where the least significant bit is "1", and output four "0"s in a case where the least significant bit is "0".

8. A two-dimensional Discrete Cosine Transformation device for two-dimensional discrete cosine transforming 8×8 block data, comprising:

segmenting the 8×8 block data into four 4×4 blocks; and performing an Hadamard transformation on each of the four 4×4 blocks using the Hadamard transformation device recited in claim 5.

9. A Hadamard transformation method for processing image data, comprising:

executing computer program steps according to a program stored on a computer-readable medium, for transforming 4×4 block image data in two dimensions including horizontal and vertical directions; including a first transform step of performing an Hadamard transformation on input image data in unit of four items of the input data, and outputting first transformed coefficients;

a first generation step of generating first data to be added for rounding process based on a row number or a column number of the 4×4 block data;

a first adding step of adding the first transformed coefficients to the first generated data;

a first discarding step of discarding the lease significant bit of an added result in said first adding step;

a transporting step of transporting data whose the lease significant bit is discarded in said first discarding step;

a second transform step of inputting the data transported in said transporting step and performing an Hadamard transformation on the data in unit of four items of the data and outputting second transformed coefficients;

a second generation step of generating second data to be added for rounding process based on a row number or a column number of the 4×4 block data;

a second adding step of adding the second transformed coefficients to the second generated data; and a second discarding step of discarding the lease significant bit of a result added in said second adding step, where in the first generated data had odd number "1"s and the remaining of the first added data includes "0"s, and the second generated data is used to cancel propagation errors superposed over the second transformed coefficients.

10. A two-dimensional Discrete Cosine Transformation method of two-dimensional discrete cosine transforming 8×8 block data, comprising the steps of:

segmenting the 8×8 block data into four 4×4 blocks; and performing an Hadamard transformation on each of the four 4×4 blocks using the Hadamard transformation method recited in claim 9.

11. A computer readable storage medium having stored thereon the program that executes the Hadamard transformation method according to claim 9.

* * * * *

UNITED STATES PATENT AND TRADEMARK OFFICE
CERTIFICATE OF CORRECTION

| | | |
|---|---|---|
| PATENT NO. | : 7,284,026 B2 | |
| APPLICATION NO. | : 10/603603 | |
| DATED | : October 16, 2007 | |
| INVENTOR(S) | : Tadayoshi Nakayama | |

It is certified that error appears in the above-identified patent and that said Letters Patent is hereby corrected as shown below:

ON THE TITLE PAGE AT (57) ABSTRACT:

Line 1, "an" should read --a--; and
Line 11, "an" should read --a--.

SHEET 11

FIG. 11, "TRANSFORMATIOM" (two occurrences) should read --TRANSFORMATION--.

SHEET 12

FIG. 12, "TRANSORMATIOM" (two occurrences) should read --TRANSFORMATION--.

COLUMN 1

Line 7, "an" should read --a--; and
Line 34, "An" should read --A--.

COLUMN 3

Line 28, "arises" should read --arise--.

COLUMN 4

Line 5, "an" should read --a--; and
Line 10, "an" should read --a--.

COLUMN 5

Line 54, "three" should read --three of--;

COLUMN 15

Line 2, "an" should read --a--; and
Line 32, "an" should read --a--.

UNITED STATES PATENT AND TRADEMARK OFFICE
CERTIFICATE OF CORRECTION

PATENT NO. : 7,284,026 B2
APPLICATION NO. : 10/603603
DATED : October 16, 2007
INVENTOR(S) : Tadayoshi Nakayama It is certified that error appears in the above-identified patent and that said Letters Patent is hereby corrected as shown below:

<u>COLUMN 16</u>

Line 1, "an" should read --a--;
Line 9, "lease" should read --least--;
Line 11, "the lease" should read --least--;
Line 14, "an" should read --a--;
Line 22, "lease" should read --least--;
Line 30, "of" should read --for--; and
Line 33, "an" should read --a--.

Signed and Sealed this

Twenty-third Day of September, 2008

JON W. DUDAS
*Director of the United States Patent and Trademark Office*